United States Patent [19]

Dye

[11] Patent Number: 4,459,663

[45] Date of Patent: Jul. 10, 1984

[54] DATA PROCESSING MACHINE AND METHOD OF ALLOCATING INVENTORY STOCK FOR GENERATING WORK ORDERS FOR PRODUCING MANUFACTURED COMPONENTS

[75] Inventor: Gordon R. Dye, Warren, Mich.

[73] Assignee: American Business Computer, Southfield, Mich.

[21] Appl. No.: 280,175

[22] Filed: Jul. 2, 1981

[51] Int. Cl.³ .............................................. G06F 15/24
[52] U.S. Cl. .................................... 364/200; 364/300
[58] Field of Search ... 364/200 MS File, 900 MS File, 364/300, 403, 468

[56] References Cited

U.S. PATENT DOCUMENTS 3,784,802  1/1974  Imai et al. .......................... 364/403

Primary Examiner—Raulfe B. Zache

Attorney, Agent, or Firm—Harness, Dickey & Pierce

[57] ABSTRACT

A data processing machine is provided for automatically and efficiently controlling the manufacture of designated end item products and components which are used to make them. Product information is entered and stored in memory as job files, inventory files, and bill of materials files. Actual and planned customer orders as well as work orders are represented in the job file in a common format. Each job includes all of the due dates and quantities which relate to a single customer or part number. Once the job file has been created, the existing inventory stock is dynamically allocated under system control to all of the orders in the job file. The system uses the designated stock quantities in the job file to automatically generate internal work orders for the manufactured components necessary to fill the customer orders.

10 Claims, 10 Drawing Figures

DATA STRUCTURE FOR DYNAMIC (SOFT) STOCK ALLOCATION
& AUTOMATIC SPECIFICATION OF WORKORDER REQUIREMENTS

| DISK | HIGH SPEED MEMORY | |
|---|---|---|
| | RECORD AREAS | WORKING STORAGE |
| INVENTORY FILE | Part Number<br>Quantity In Stock<br>Fabrication Lead Time<br>  in Days | Current Part Number |
| JOB FILE | Customer Number<br>Part Number<br>Due Date 1<br>Quantity 1<br>Due Date 2<br>Quantity 2<br>.<br>.<br>.<br>Due Date 9<br>Quantity 9<br>Quantity Beyond<br>Designated Stock Quantity<br>Designated Stock Temporary<br>  Area | Arrays:<br>  . Due Dates<br>  . Quantities Required<br>  . Job Record Numbers<br><br>Last Array Element<br>  Occupied<br>Current Array Element<br>Lowest Due Date Found<br>Lowest Due Date Element<br>  Number<br><br>Accumulator |
| JOB POINTER FILE | Part Number<br>Job Record Number | Current Work Order<br>Job Number |
| BILL OF MATERIAL FILE | Part Number<br>Record Number (within part)<br>Raw Material Part Number<br>Quantity Required per End Item | Current Date<br>Eight Weekly Future<br>  Dates |
| UNSORTED EXTRACT WORK FILE | Part Number<br>Due Date<br>Quantity Required | |
| SORTED EXTRACT WORK FILE | Part Number<br>Due Date<br>Quantity Required | |

FIG. 5

DATA PROCESSING MACHINE AND METHOD OF ALLOCATING INVENTORY STOCK FOR GENERATING WORK ORDERS FOR PRODUCING MANUFACTURED COMPONENTS

DESCRIPTION

1. Technical Field

This invention relates to data processing machines and more particularly, to systems and methods of controlling the production of manufactured components.

2. Background Art

In large manufacturing concerns the task of coordinating the various aspects of product manufacturing can be extremely burdensome. It is necessary to keep track of both actual and planned customer orders including designation of parts, due dates and quantities and to correlate the information with such things as existing stock, raw materials, and lead time necessary to fabricate the end items in the quantities required in a timely manner. It is also critical that material requirements and shortages are projected so that corrective action may be undertaken to maintain production schedules. These projections are based on bills of materials in conjunction with actual and planned customer orders for end products, actual unfilled orders to vendors for materials, existing quantities of stock, and lead time requirements to manufacture each end item. This material shortage projection technique is referred to in the industry as material requirements planning (MRP).

Automatic data process machines have become widely used in implementing material requirements planning. These prior art machine systems are capable of generating a report which discloses positive or negative balances of materials stock at selected time intervals as a function of orders to be completed and the amount of in stock inventory. These balances or required quantities are determined by "exploding" net end item requirements against the bill of materials for each end item. That is, each quantity of materials required to make an end item is multiplied by the quantity of end items to be manufactured.

The prior art machine systems required accurate information regarding the net actual and planned customer end item requirements as well as the net requirements for manufactured components which are used to make the ultimate end items. Unfortunately, it is extremely difficult to obtain accurate information of this type using the machine systems of the prior art. Typically, conventional machine systems would automatically allocate existing stock on hand to a particular job when it is registered. For example, when an order is received from a particular customer for a given part of the machine systems in the past would directly allocate stock to that particular job. The system assumes that this allocated stock is actually used to manufacture the end item. In the real world environment, however, this is often not the case. For example, revisions to customer order will effect the allocation of stock as will changes in shop priorities. Thus, it is necessary for the users of these systems to continually update the information in the system whenever there are changes. This is particularly burdensome for shop personnel. Quite often a shop foreman may take stock that was allocated to one job and use it for another job in order to complete a rush order. Similarly, the amount of scrap or defective products that is generated from the stock must be continually reported to the system. Otherwise, the system has no way of accurately projecting material shortages when generating its material requirements planning report.

It should be appreciated that the format of stored information significantly affects the efficiency of data processing systems. Prior art systems have used different representations (formats) for planned customer orders, actual customer orders, and internal work orders. In other words, the different orders were classified and treated as separate entities in the system depending upon the origin of the order even though the same materials or manufactured components are used in filling each of the orders. This approach required a relatively large amount of memory space and sophisticated computation capabilities which increase the cost of the system. In fact, it has been necessary to define a separate Master Production Schedule subsystem to combine the information that is included in these three divergent sources.

The present invention is directed to solving one or more of these problems.

DISCLOSURE OF THE INVENTION

It is the primary objective of this invention to provide an efficient data processing machine for accurately controlling the production of manufactured components with a minimum of manual intervention, especially the need for continuous shop floor reporting.

In this discussion, the term "end item" denotes anything manufactured for stock or for shipment, and "manufactured components" means any end item used in the manufacture of another end item.

The present invention departs quite dramatically from conventional systems in that stock is not permanently allocated to a particular job when it is received. Instead, the machine system automatically maps all end item stock to the jobs on a priority basis every time a MRP report is to be produced. In such manner, it is not necessary to continually update the system with any changes made to the original stock allocation as required in the prior art approach. The only feedback from the shop floor that is necessary is when an end item is completed so that the gross inventory counts can be adjusted accordingly. The mapping process shall be referred to as a dynamic or soft allocation because it occurs each time a MRP projection is to be performed and because from a user standpoint it is not absolutely necessary to adhere to the given allocation since it is merely used as a tool to generate sufficient information to control the timely making of manufactured components.

In the preferred embodiment, multiple orders for the same items and destination are combined into limited groups of corresponding due dates and quantities. The use of a single representation format for all end item requirements eliminates the need for a separate Master Production Schedule and attendant processing, including feedback reprocessing to achieve a closed system. This grouping technique also makes the dynamic allocation of in stock quantities and the determination of internal work order requirements much more manageable and efficient than separate storage of similar requirements. The present invention employs a digital storage means for temporarily storing information defining actual customer orders, planned customer order, and internal work orders. All of this information is arranged in a random access memory in a common format by customer identification number and part number, followed by all of the quantities and corresponding due data for the same part number. The identification number for an actual customer order corresponds to a given customer and/or destination. The identification number for all planned orders are assigned the same preselected number. The identification number for internal work orders is the same as the part number involved.

The data processing machine of the preferred embodiment further includes input means and data storage means for receiving and storing information regarding inventory, and bills of material, as well as customer orders. Control means, responsive to a first command, is operative for fetching the quantity in stock and loading each of the job records with an allocable portion of the stock. This designated stock quantity is first allocated to actual and planned customer orders per part number beginning with the oldest due date and secondly to work orders. In such manner the system is designed to dynamically allocate existing stock to each of the jobs every time an MRP report is necessary.

The present invention also has the capability of automatically generating internal releases, i.e., generating work orders for manufactured components which go into making up a given end item. The control means in the data processing machine of the present invention is further responsive to a second command to subtract the designated stock quantity from the total requirements quantities for each group of jobs. The bill of materials file and inventory file is then read. From this information the machine calculates the quantities and due dates for each of the manufactured components making up each of the end items when sufficient inventory stock is not available to fill orders. A printer or other display device is provided for outputting this information so that management can react to the projected net manufacturing requirements. Also the results are stored in a form suitable for directly controlling automated production, in conjunction with known MRP technology.

BRIEF DESCRIPTION OF THE DRAWINGS

These and other objects and advantages of the present invention will become apparent to one skilled in the art after reading the following specification and by reference to the drawings in which:

FIGS. 2(A-C) is a flow chart illustrating the sequence of steps performed by the data processing machine during the stock designation operation;

FIGS. 4(A-D) is a detailed flow chart illustrating the generation of internal work orders.

DESCRIPTION OF THE PREFERRED EMBODIMENT

Figure 1:
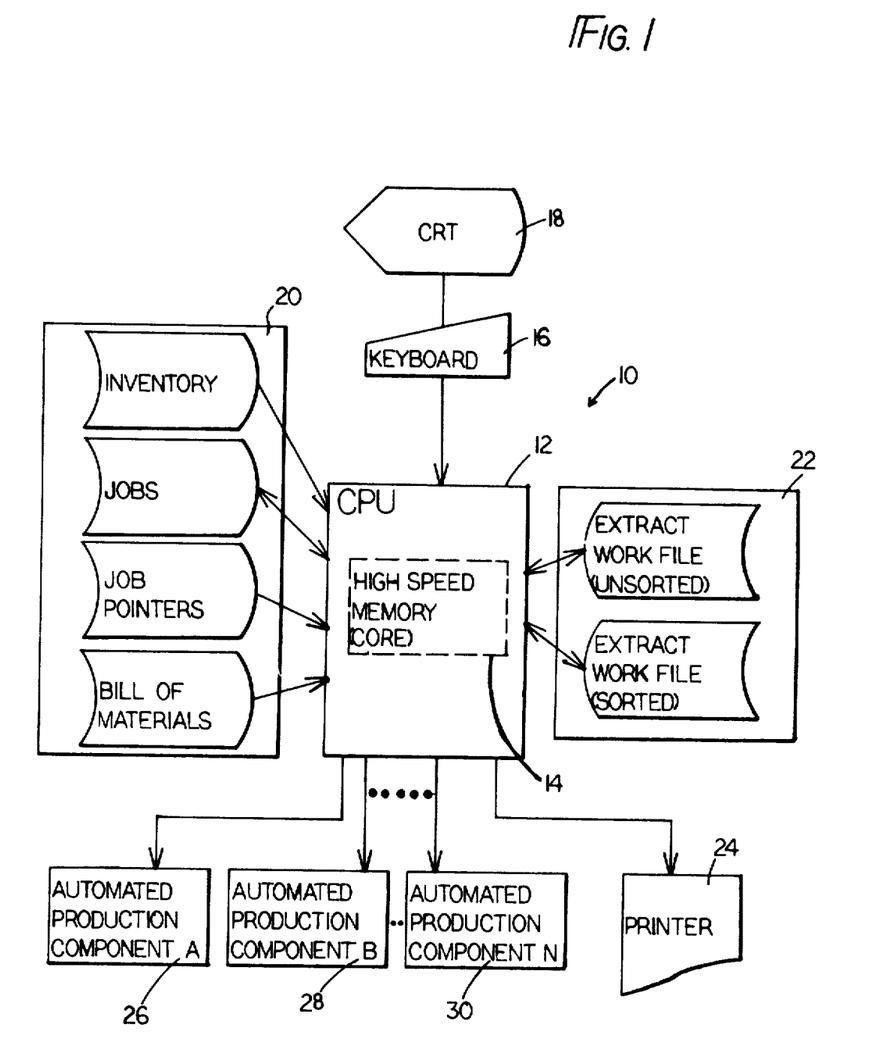
FIG. 1 is a block diagram of an automatic data processing machine embodying the present invention.

FIG. 1 illustrates an automatic data processing machine system 10 which incorporated the preferred embodiment of this invention. System 10 includes a central processing unit (CPU) 12 having internal high speed memory 14 which is also often referred to as core memory. Suitable input devices are provided for entering information into the system. Such input devices include a work station having a keyboard 16 and cathode ray tube (CRT) display 18. External memory devices are connected to CPU 12 and serve as random access storage devices for digital information. These external memory devices may take a variety of forms but in the preferred embodiment two disk memories 20 and 22 are utilized. System 10 further includes suitable output devices for utilizing the information generated by the system 10 to control the production of manufactured components. These output devices may include a printer 24 for printing out reports such as MRP reports. Alternatively, the system 10 may be used to initiate automatic production of the manufactured components by timing the beginning of the operation of machines 26, 28, and 30 to produce the needed number of components to fill customer orders.

In the preferred embodiment a general purpose digital computer is programmed so as to operate in the manner prescribed by the instructions in the program. A suitable general purpose computer for carrying out the various features of this invention is an IBM system 5120 made by International Business Machines Corporation. However, it should be understood that the spirit of the invention can also be performed by hard wired circuitry or a special purpose computer, if desired. Such a special purpose computer would contain integrated circuit devices and the like which contain the same basic elements which are only temporarily utilized by a general purpose computer when instructed by the software programs. Consequently, the scope of this invention is intended to be determined by the following claims and not by the particular embodiment described herein.

Keeping this in mind, the present invention will be described in connection with how a general purpose computer can be programmed and operated to achieve the objectives of the present invention. From the following detailed description one skilled in the art will be readily capable of generating the specific instruction set forth programming the computer to perform the desired operations.

The system 10 progresses through several different sequential operational stages. The first stage is the inputing phase in which information is entered into the system and stored in external memory. The second stage includes the utilization of CPU 12 as a control means to allocate inventory stock to particular jobs. The third stage is to automatically generate internal work orders so that the user may begin the task of making components which are used in making particular end items. The fourth stage utilizes the newly calculated information which is stored in the external memory to generate a materials requirement planning (MRP) report.

Some definition of terminology is in order. The term "end item" is used to denote any product to be manufactured to stock or for shipment, including intermediate products which may be stocked on the shop floor in barrels or on pallets, to be used as raw materials in the manufacture of other end items. The term "manufactured components" means those items which are manufactured by the user, and are in turn used in making other end items. For example, components A, B and C may need to be manufactured by the user who also manufactures and sells item X as an end product. "Work orders" are documents used to initiate the production of manufacture components.

Figure 2A:
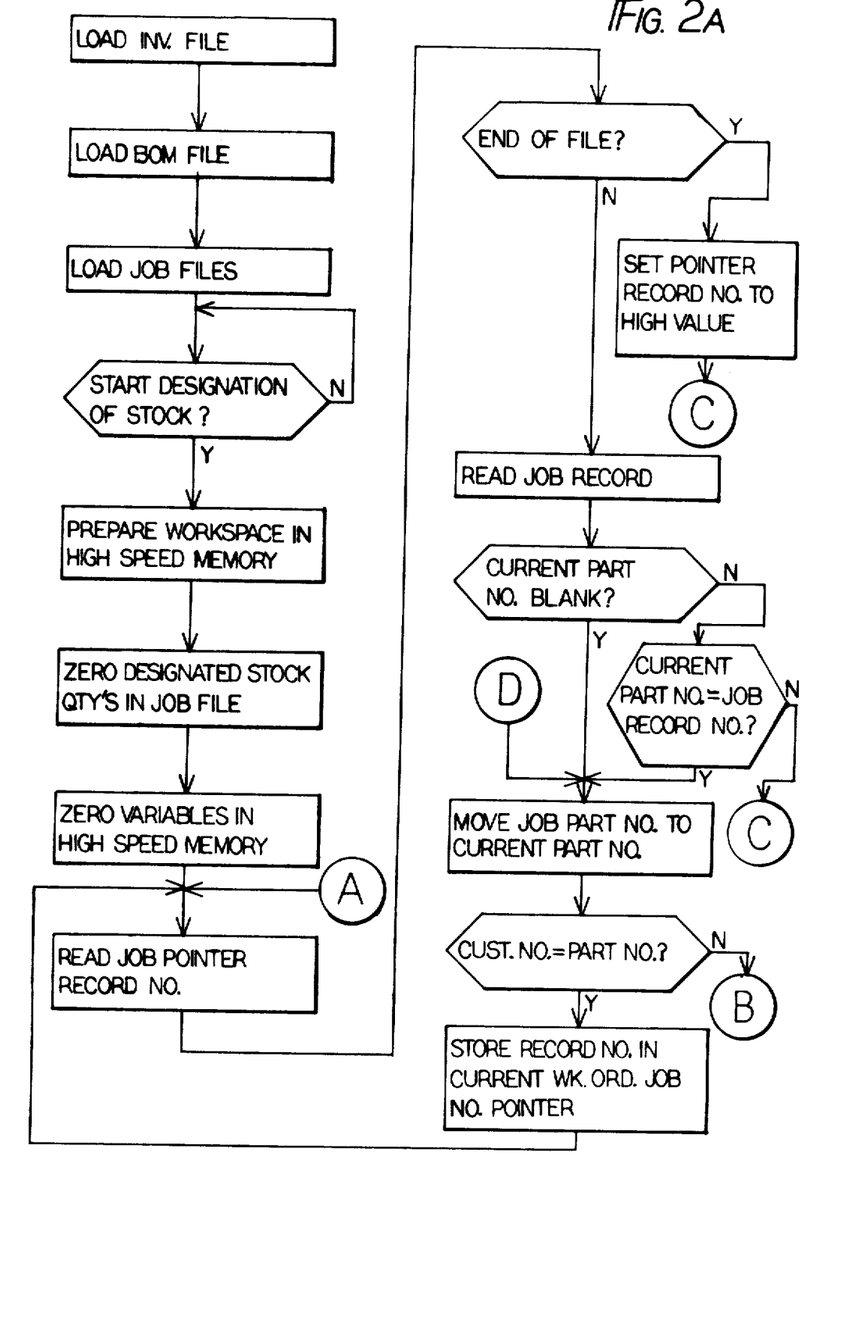
Figure 2B:
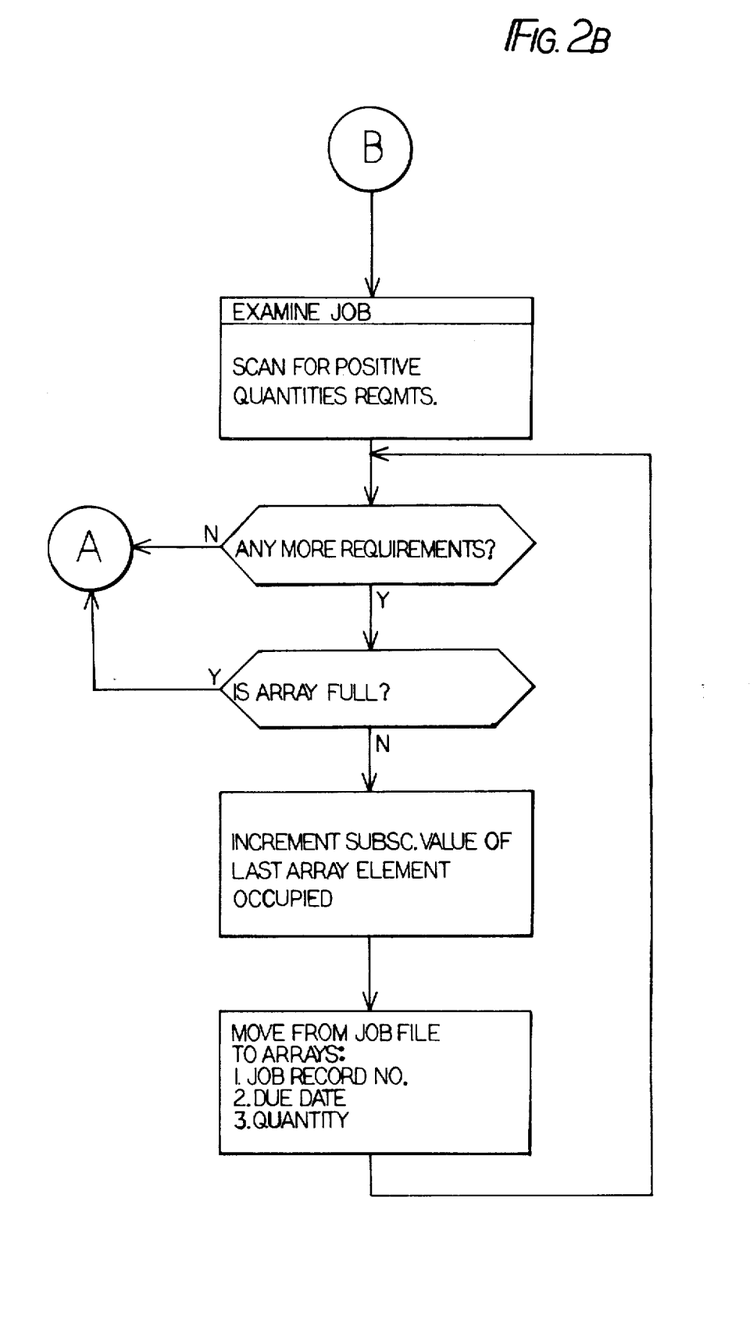
Figure 2C:
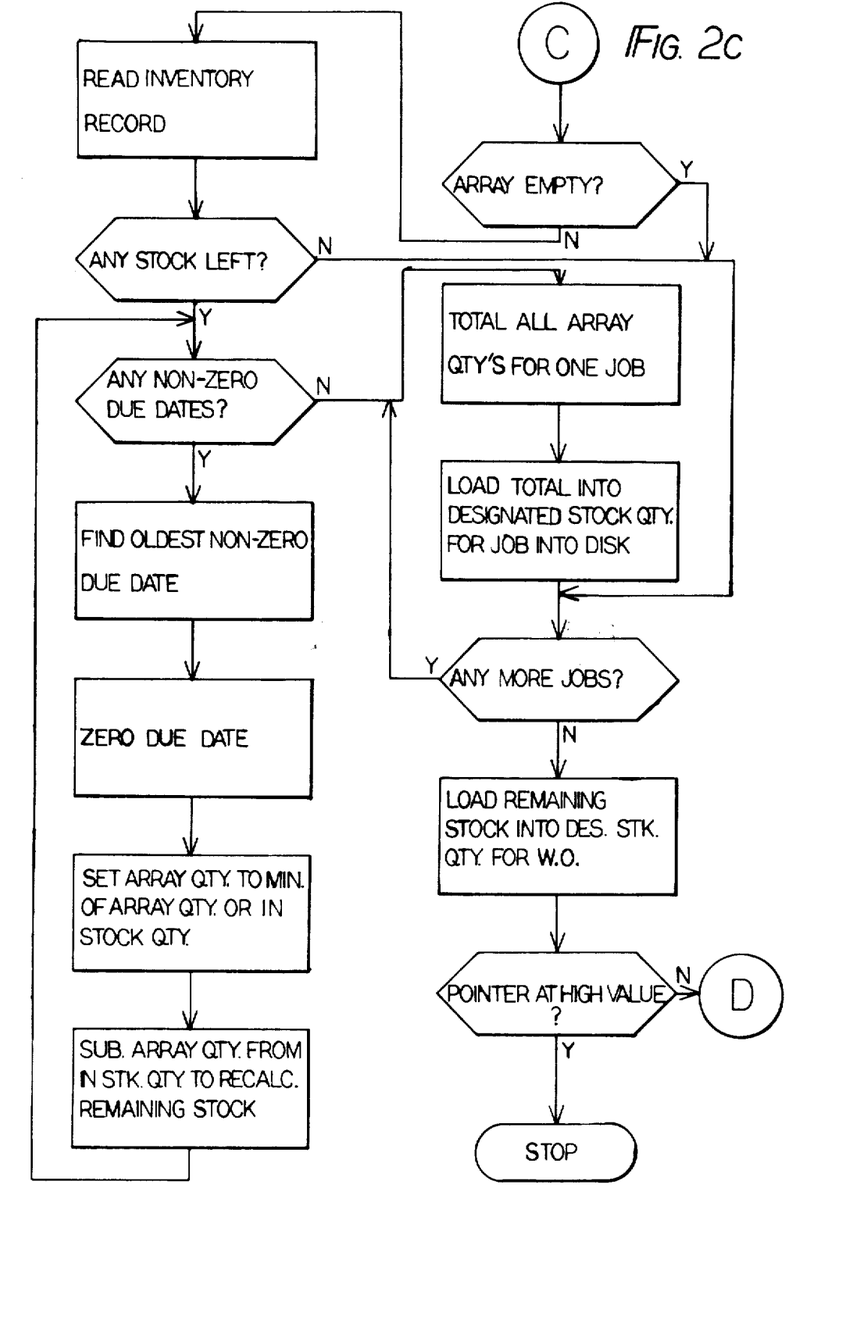

Referring now to FIG. 2 as well as FIG. 1, during the first stage the inventory file, bill of materials file, and job files are loaded into disk memory 20. For the inventory file, the user operates keyboard 16 to enter the following information of each part:
Part Number
Quantity in Stock
Fabrication Lead Time in Days For example, if the end item is an automotive tie rod then a part number associated with the tie rod is entered along with the number of tie rods currently in stock and the number of days it takes for the user to make a tie rod.

The bill of materials file is similarly loaded into disk memory 20 by the user. The bill of materials file includes the following information:
Part Number
Record Number (user assigned value)
Raw Material Part Number
Quantity Used The bill of materials file thus contains all of the information regarding all of the materials necessary to make a particular part. There may be several records for a given part if, for example, more than one manufactured component and/or purchased material goes into making the particular end item.

The loading and organization of the job file is one feature of the present invention. A single representation format is used for all end item requirements whether they originate from actual customer orders, planned customer orders, or internal work orders. Additionally, multiple orders for the same part to be shipped to a single destination are grouped into a single job record. Each job file record includes the following information:
Customer Identification Number
Part Number
Due Date 1
Quantity 1
Due Date 2
Quantity 2
. . .
Due Date 9
Quantity 9
Designated Stock Quantity
Designated Stock Quantity Temporary Area The latter two items (Designated Stock Quantity, Designated Stock Quantity Temporary Area) are not entered by the user but are system generated as will be later discussed herein. Sufficient space is merely reserved for these items.

For actual customer orders the identification number is a user selectable number which corresponds with a given customer (e.g. Ford) or a given destination (e.g. Dearborn). For planned customer orders, i.e. those in which orders are expected but not yet received, the user enters a preselected code as the identification number for all such jobs to indicate that it is a planned order. For internal work orders, the user places the part number in the space allocated for the identification number so that the part number equals the identification number.

Thus, it can be seen that disk memory 20 will contain a plurality of job records having a common format, regardless of their origin, with the information being arranged in groups by identification number and part number, followed by all of the quantities and corresponding due dates for the same part number.

The system 10 is operative to generate an alternate job sequence pointer file such that the individual jobs can be accessed in part number order as well as by customer number (ID number). This sequence of job pointers is also loaded into disk memory 20 and can be accessed on demand by CPU 12.

After this information is loaded into the memory, system 10 is ready to begin the designation of stock to the individual jobs. The user initiates the designation of stock routine through keyboard 16 which causes CPU 12 to prepare a work space in internal high speed memory 14. This work space should be of sufficient size to hold variable identifying the following:
Current Job Pointer Record
Current Part Number
Subscript Value of Last Array Element Occupied
Current Array Element
Current Work Order Job Record Number
Current Job Record
Current Inventory Record
Accumulator In addition, space for three arrays of 500 elements each is made is memory 14. Each array is reserved for information relating to:
Job Relative Record Numbers
Due Dates
Quantities Required CPU 12 further serves to initialize each of the job records by setting the Designated Stock Quantities to zero. In addition, the following variables in memory 14 are also zeroed: Subscript Value of Last Array Element Occupied, Current Work Order Job Record Number, and Current Part Number.

The designation of stock routine proceeds by processing groups of job records. Jobs can be grouped by part number if they are accessed through the job pointer file, i.e., by successively reading a pointer file record and then reading the job record to which it points.

In general, the system during this stage operates to reach each of the job files by part number and writes the job record number, due date, and quantities required into the three arrays in high speed memory 14. When the part number changes, the system begins to process the information in the arrays. The system starts with the oldest due data and takes the quantity in Stock (from the inventory file) and allocates a portion of the stock to that job record associated with the oldest due date. The Quantity in Stock is reduced by the allocated stock and the process continues for all job records associated with actual and planned customer orders. Provision is made for identifying work orders in the job file such that stock is not allocated to work orders unless all of the planned and actual customer orders have sufficient stock allocated to them to fulfill their requirements.

Figure 5:
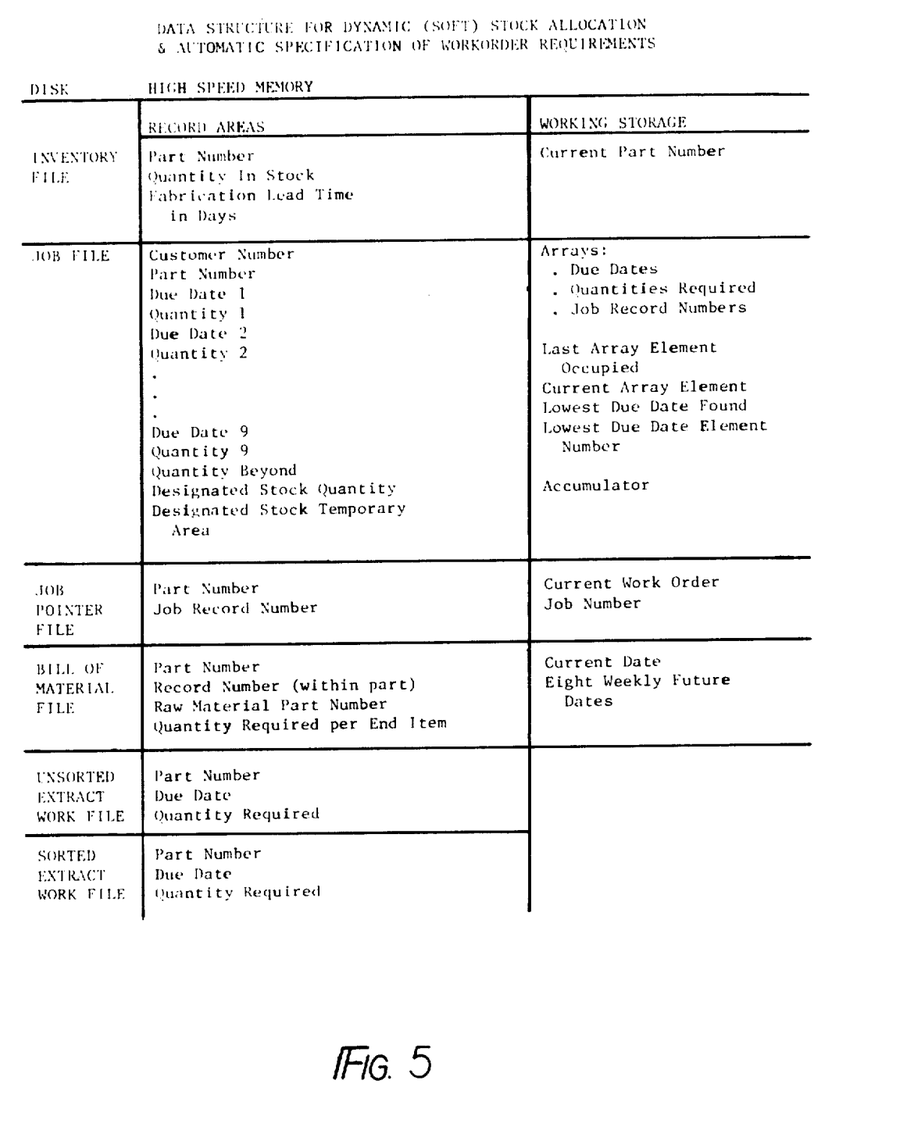
FIG. 5 is a schematic diagram representing the structure of data in the machine of the present invention.

Reference to FIG. 5 will aid in the understanding of the location and purpose of the various variables and fields used in disk memories 20, 22, and high speed memory 14. In general, the variables and arrays in the working storage area in high speed memory 14 are used during the computational processing of the data. The record space in high speed memory 14 contains fields which correspond with the fields in the files in disk memories 20, 22 and are used to buffer and manipulate the data between the disk and high speed memories.

Referring now in particular to the flow chart of FIG. 2A (entry point A) CPU 12 reads the first job pointer and accesses the corresponding job record in disk memory 20 and reads it. If no more job pointer records exist, CPU 12 places an arbitrarily selected high value in the current job pointer record space to indicate that the end of the file has been reached.

If the Current Part Number is not blank and is not equal to the Part Number in the job record, CPU branches to the subroutine labeled C (FIG. 2C) for processing the information loaded into the arrays. These tests will be met when information relating to a different part number is read from the job record. Otherwise, CPU 12 continues the process of filling the array. The job Part Number is loaded into the Current Part Number variable in CPU memory 14. The CPU 12 then detects whether this job is a work order. This is done by comparing the job Customer ID Number with the job Part Number. If the two are equal, CPU 12 acknowledges that the job is a work order and moves on to complete the loop after storing the Job Record Number in the scaler labeled current work order job pointer.

Referring to FIG. 2B, if the CPU determines that the job record being read is not a work order, it proceeds to load the arrays in the CPU memory 14 with the job record number, due date, and quantity for the particular job record. In addition, the subscript value of the last array element occupied is incremented so that the array filling process can continue until the array is full.

When the end of the file is reached or a record is read for a new part number, the CPU branches to the routine shown in FIG. 2C for allocating the stock to each of the jobs contained in the arrays. In other words, system 10 begins to allocate stock once the end of the job group for a particular part number is reached. Referring then to FIG. 2C, CPU 12 makes a check to determine whether the array is empty, i.e. to check to see if there is any further information in the array to be processed. If the array is not empty, the CPU reads the inventory file in disk memory 22 and determines whether there is any stock left to be designated. This step is performed simply by checking to see whether the Quantity in Stock for a particular part number is greater than zero.

If there is stock to be allocated, the CPU checks for any non-zero due dates in the array in the CPU memory 14. As will be explained this will determine whether all of the job records have been allocated with stock since those due dates that have been already allocated with stock will be zeroed. The CPU then makes a scan of the non-zero due dates to find the oldest due date in the array. That due date is then zeroed. The array Quantity Required element is then set to the minimum of the array Quantity Required or Quantity in Stock. For example, if the array Quantity Required for that due data is 20 and In Stock Quantity is 100, then the array quantity element will be set with 20. If, however, the In Stock Quantity is 10, the array quantity element will be set with the number 10. The CPU then proceeds to subtract the array quantity from the In Stock Quantity to recalculate the remaining stock. The recalculated Quantity in Stock is NOT then loaded back into the inventory file in disk memory 12. This process loops through this sequence of steps until all of the array due dates have been zeroed. Once all of the array due dates have been zeroed, i.e. allocated with stock, the total of array Quantities Required for one job record is accumulated. This total is then loaded into the Designated Stock Quantity for the job disk memory 12. It will be remembered that the Designated Stock Quantity is a space allocated in the job file for each job. Each job in the array is processed. This pass against the arrays is performed serially beginning with the first element and ending when the Last Element Occupied has been processed.

After the array has been processed, any remaining Quantity in Stock in high speed memory 14 is allocated to the work order for that part, such that the work orders will also contain a Designated Stock Quantity.

This stock allocation process progresses through each of the job record groups, part by part, in the job file stored in the disk memory 22. When this soft or dynamic stock allocation process is completed, each job record on disk will include a Designated Stock Quantity (zero or greater) which is a function of the Quantity in Stock from the inventory file. This information may be used for calculating customer and planned net end item requirements, and as a basis for automatic specification of internal work order requirements (described below).

Figure 3:
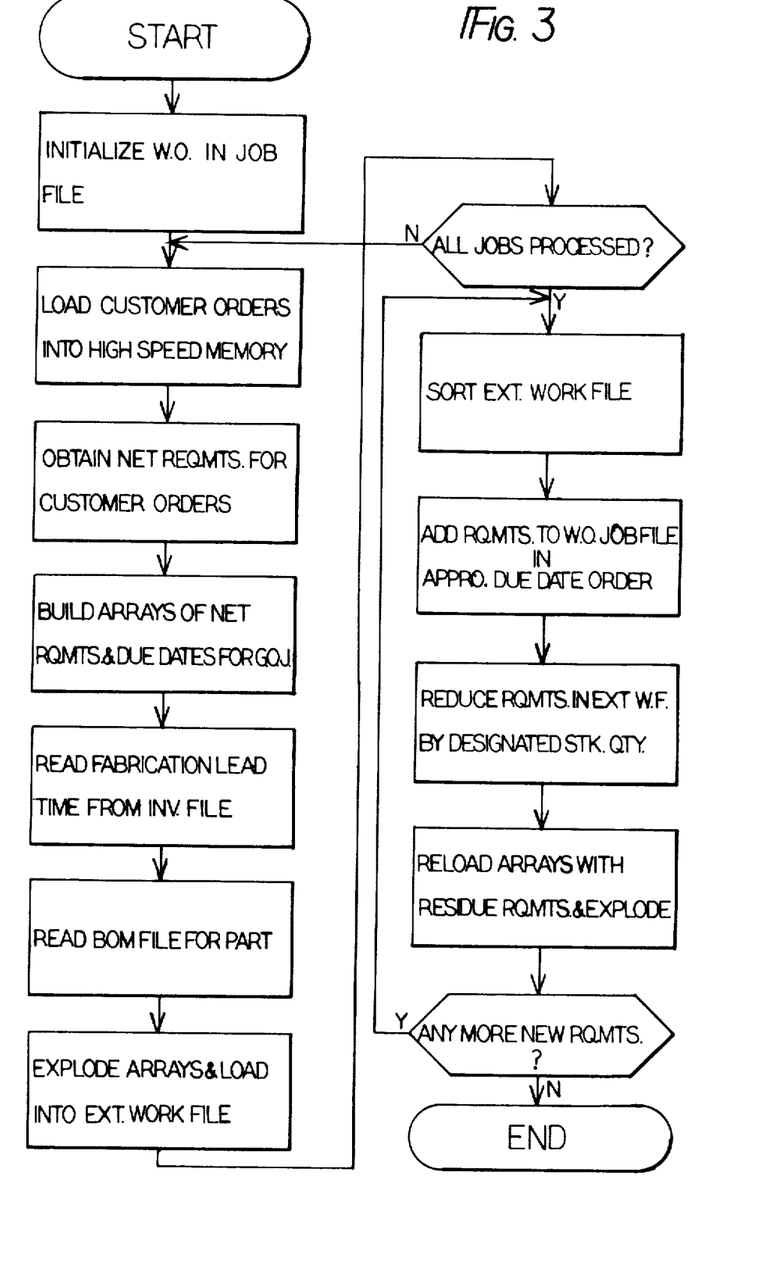
FIG. 3 is a generalized flow chart illustrating the sequence of operation performed by the machine to generate internal work orders.

The third stage of the machine operation is the automatic specification of an internal work order requirements. This stage occurs after the allocation of the Designated Stock Quantities (FIG. 3). The job file in disk memory 22 is then examined by the CPU to initialize all of the work order jobs therein by zeroing the requirements Quantities therein. Also the Designated Stock Quantity in these work order jobs is copied or transferred to a designated stock temporary work space in the job record on disk (Designated Stock Quantity Temporary Area). Additionally, nine weekly due dates are generated for the job by CPU 12 starting with the current date.

Then the entire job file is read from the beginning, in part number order. As each job is read, the Designated Stock Quantity is subtracted from its requirement quantities in due data order. Since the work order jobs have been zeroed, only net requirements for actual or planned customer jobs will be identified by this operation. Net requirements and due dates are loaded into arrays for all jobs for each part number group. Next, the end item fabrication lead time is read from the inventory file. Then the bill of materials file for the part number is read to determine which purchased raw materials/manufactured components are required to make the subject part. Only manufactured components are utilized in this process. Other components/materials are ignored. CPU 12 then operates on the information to generate an exact work file in disk memory 22. The extract work file thus contains a series of requirements records for each manufactured component that is used to make each of the end items. The requirements records will include a part number for the associated component, and due dates which have been advanced by the fabrication lead time for the component. The extracted work file will also contain the quantity of components that are needed to manufacture the net end item requirements. This process continues in group by part number until all of the job records have been examined and an extract work file generated.

The extracted work order requirements are sorted by the system 10 by part number. Then the sorted extract work file records are read in groups by part number. The requirements quantities in the extract work file are then transferred (added) to the work order records in the job file in disk memory 20. The CPU 12 compares the due date in the extract work file (which has already taken into account fabrication lead time) with the preassigned due dates in the work order job records. The requirement quantities are loaded into the appropriate quantity memory location (Quantity 1, Quantity 2, etc.) associated with the appropriate due date (Due Date 1, Due Date 2, etc.) in the job record. Due dates are regarded as period ending dates.

Next, the quantity in the designated stock temporary area is subtracted from (allocated to) the quantities in the extract work file for that component. In effect, this reduces the requirements for this particular component by the number of components in available stock. The designated stock temporary area changes are written onto disk.

Finally, another extract is performed using the remaining (net) extracted requirement quantities as end item requirements. Arrays are loaded and the bill of material is read as before and new additional component requirements are extracted, into the unsorted extract work file in disk memory 22. This process continues until no additional component requirements are found.

Figure 4A:
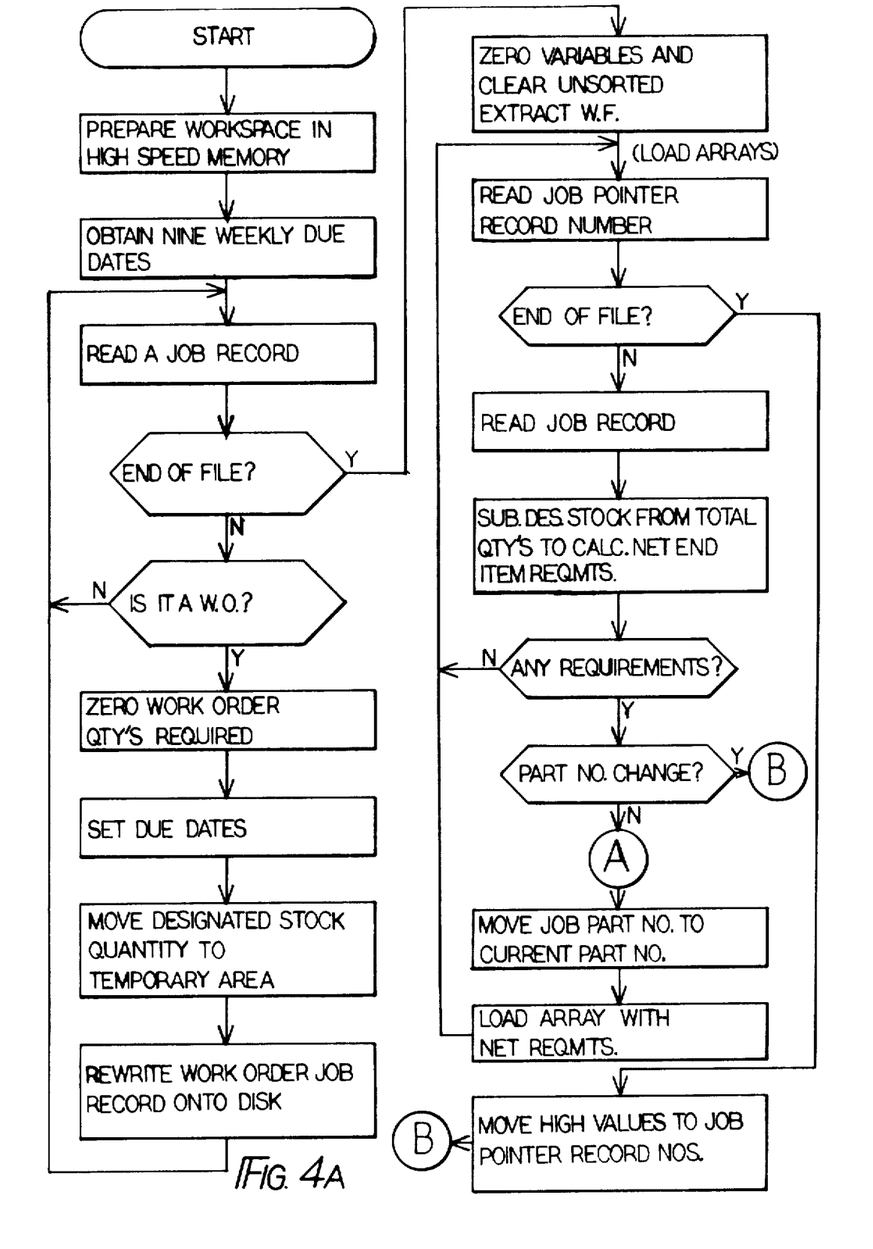

FIG. 4 shows the details of the operational steps performed by system 10 during the automatic specification of the internal work order requirements. Beginning with FIG. 4A, CPU 12 prepared space in a high speed memory 14 for the following working storage areas:

Current Job Pointer Record
Current Job File Record
Current Inventory Record
Current Bill of Material Record
Current (sorted) Extract Requirements Record (Incoming)
Unsorted Extract Requirements Record (Outgoing)
Current Date
Eight Weekly Future Dates
Accumulator
Due Date Array
Requirements Array
Subscript Value of Last Array Element Occupied
Current Part Number
Current Array Element Number The user or the system automatically generates fields defining the current date and the next eight weekly future dates.

The CPU then reads the first job record from the job file in disk memory 20. If it is not the end of the file, a check is made to determine whether the customer identification number is the same as the part number for the record being interrogated. This will determine whether the job record is a work order. If it is a work order, the quantities required are zeroed and the previously defined nine weekly due dates are copied into the due dates fields in the record area of high speed memory 14. The Designated Stock Quantity (as previously defined during the dynamic stock allocation process) is copied to the field labeled Designated Stock Quantity Temporary Area. This new information is then transferred from high speed memory 14 to the job record in disk memory 20. This process continues through all of the job records in the job file to effectively screen out all of the planned and actual customer orders and initialize the work order portions of the job file.

When the end of the job file is reached, the CPU operates to zero the subscript value of the last array element occupied and the requirements array (quantities required). In addition, the Current Part Number variable is blanked and the unsorted extract file in disk memory 22 is cleared.

The next (or first) record from the job pointer file is then read. If it is not the end of the file, the job record pointed at is read to examine the Quantities Required and the associated Designated Stock Quantities. The Designated Stock Quantities is subtracted from each of the Quantities Required by setting the accumulator to the lesser of the Designated Stock Quantity or the Quantity Required. The contents of the accumulator are then subtracted from the Designated Stock Quantity and the Quantity Required. The purpose of this step is to calculate net end item requirements for all of the customer orders. It will be remembered that all work order quantities have been previously set to zero so they will not enter into this calculation. If there are any net requirements, i.e. sufficient stock is not available to cover the net end item requirements, the CPU determines whether there has been a part number change thereby indicating that all of the net requirements for that particular part number have been calculated and loaded into the arrays. If the part number has not changed, the part number of the job record being interrogated is moved to the Current Part Number Variable.

The CPU 12 then operates to load the array with the net requirements in the quantity required job fields. This is accomplished by examining each of the quantities in the job record looking for a nonzero value. Whenever a nonzero value is encountered the subscript value of the array element occupied variable is incremented, unless it is pointing at the last array element. The due date is moved and the quantity is added to their corresponding arrays at the position designated by the last array element occupied variable. This process for each of the job records until there is a change in part number or the end of file is reached.

Figure 4B:
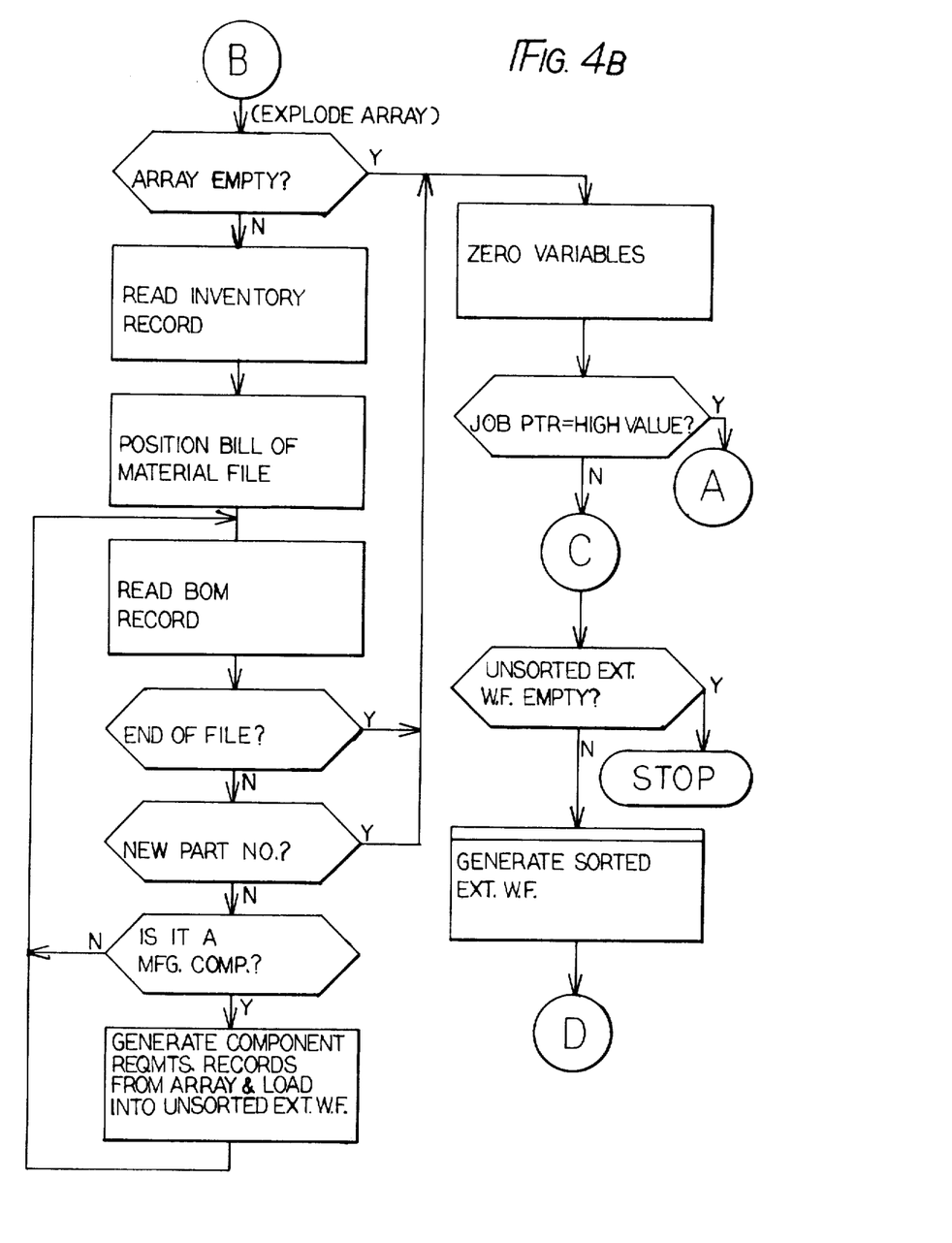

When this occurs, the information in the array is exploded by the processing steps shown in FIG. 4B. In general, this explosion process can be envisioned as the multiplication of each net net item part by the manufactured components listed in the bill of materials file that go into making that part. The CPU operates to determine whether there is information in the array to be processed. If so, the inventory record associated with the current part number is read to determine existing inventory for that part number. The bill of materials file is positioned (i.e., logically set to address) to read the first bill of materials record for that particular end item part. The bill of materials record is then read. The CPU checks to determine whether the bill of materials record is at the end of the file or whether the current record relates to a new part number.

CPU 12 then determines whether the bill of materials record just read relates to a manufactured component, i.e. a part that is made by the user in contrast with a part or raw material (e.g. steel) purchased from outside vendors. If it is a manufactured component a job record will have been defined with the customer number equal to the part number as previously defined during the data input stage.

If it is a manufactured component the CPU operates to generate component requirement records from the information in the array and writes these records into the unsorted extract work file in disk memory 22. This is accomplished by passing the requirements array while searching for nonzero values. For each nonzero array value the CPU writes a requirements record into the extract work file. In addition, the due date fields in extract work file are written, with the due dates advanced (made earlier) by the inventory record fabrication lead time.

This process continues for each bill of material record for a given end item part. Thus, at the end of this process the extract work file will contain a plurality of records with data defining the types (by part number) of all of the manufactured components, quantities, and advanced due dates for a given end item.

When the end of the file is reached or a new part number for an end item is detected, the subscript value of the last array element occupied and the requirements quantities in the array are zeroed. Additionally, the current part number is blanked. If the current job pointer record does not contain high values (indicating end of file) the CPU 12 examines the unsorted extract work file to determine if it is empty. If no records were generated by the explosion process the unsorted extract work file would be empty. Thus, processing is complete and is terminated. Otherwise, the extracted records are sorted by part number and are transferred to the sorted extract work file in another portion of disk memory 22.

Figure 4C:
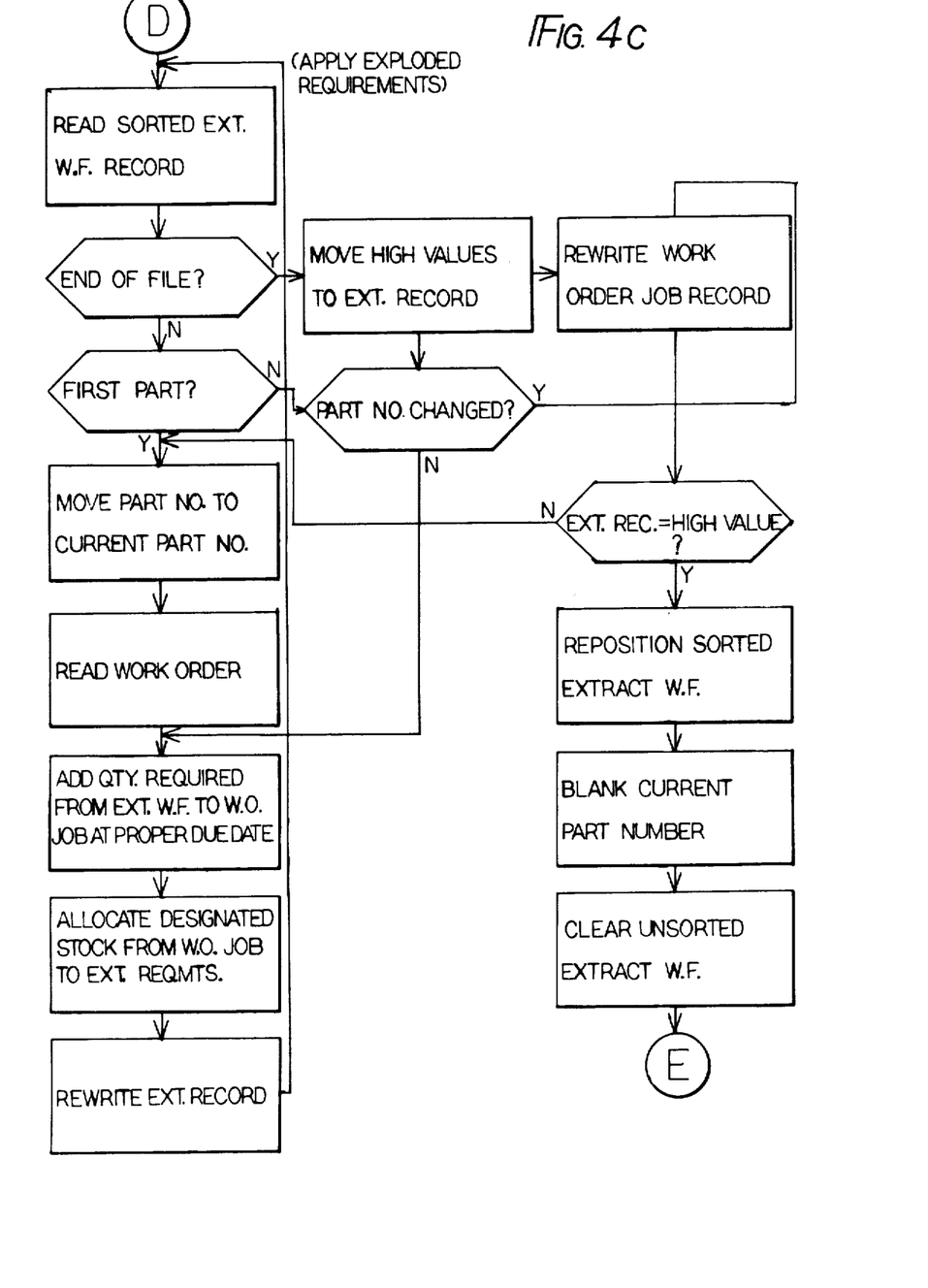

At this point in the process the CPU 12 applies the exploded requirements to the work orders job records as follows. It has been determined thus far in the process that a given number of manufactured component should be made unless there is sufficient stock already in inventory for these components. Turning then to FIG. 4C, the first extract record is read. The CPU determines whether the end of the file has been reached. If not, it checks to determine whether the Current Part Number variable is blank indicating that the extract pertains to the first component part number. If so, the extract record part number is moved to the Current Part Number variable space. The work order job record associated with the current part number is then read into high speed memory 14. The quantity required from the extract work record is then added to the work order job Quantity Required field associated with the appropriate due date. This accomplished by beginning at the lowest due date and comparing the designated due dates therein for a date which exceeds the date in the extract record.

Next, the designated stock quantity from the work order job is the allocated to the extract requirement. In other words, quantities required in the extract work record are reduced by the designated stock quantity for that particular work order. If there is not enough designated stock to cover the quantities in the extract record, then there will be residue requirements left over that will be processed later herein. If, on the other hand, there is sufficient stock, the extract work file requirements will be reduced to zero. This process is accomplished by setting the accumulator to the lessor of the designated stock temporary area quantity or the extract record requirement quantity. Then, the CPU subtracts the accumulator from both quantities. Then the updated current extract record is written onto disk memory 22. This "application to workorder" process continues until the end of file is reached or a new component part number from the extract work file is detected. Then, the work order job record is rewritten into the job file in disk memory 20.

When the end of the extract work file is reached, the current extract record number is loaded with abitrarily selected high values which is later detected by the CPU 12 to cause it to branch to other operations. When, after rewriting a workorder job, the extract work file record number is at a high value, the sorted extract work file is repositioned to begin reading the first record. The unsorted extract work file is clear and the current part number is blanked. The CPU 12 is now ready to explode any residue (net) requirements that remain from the previous operation.

Figure 4D:
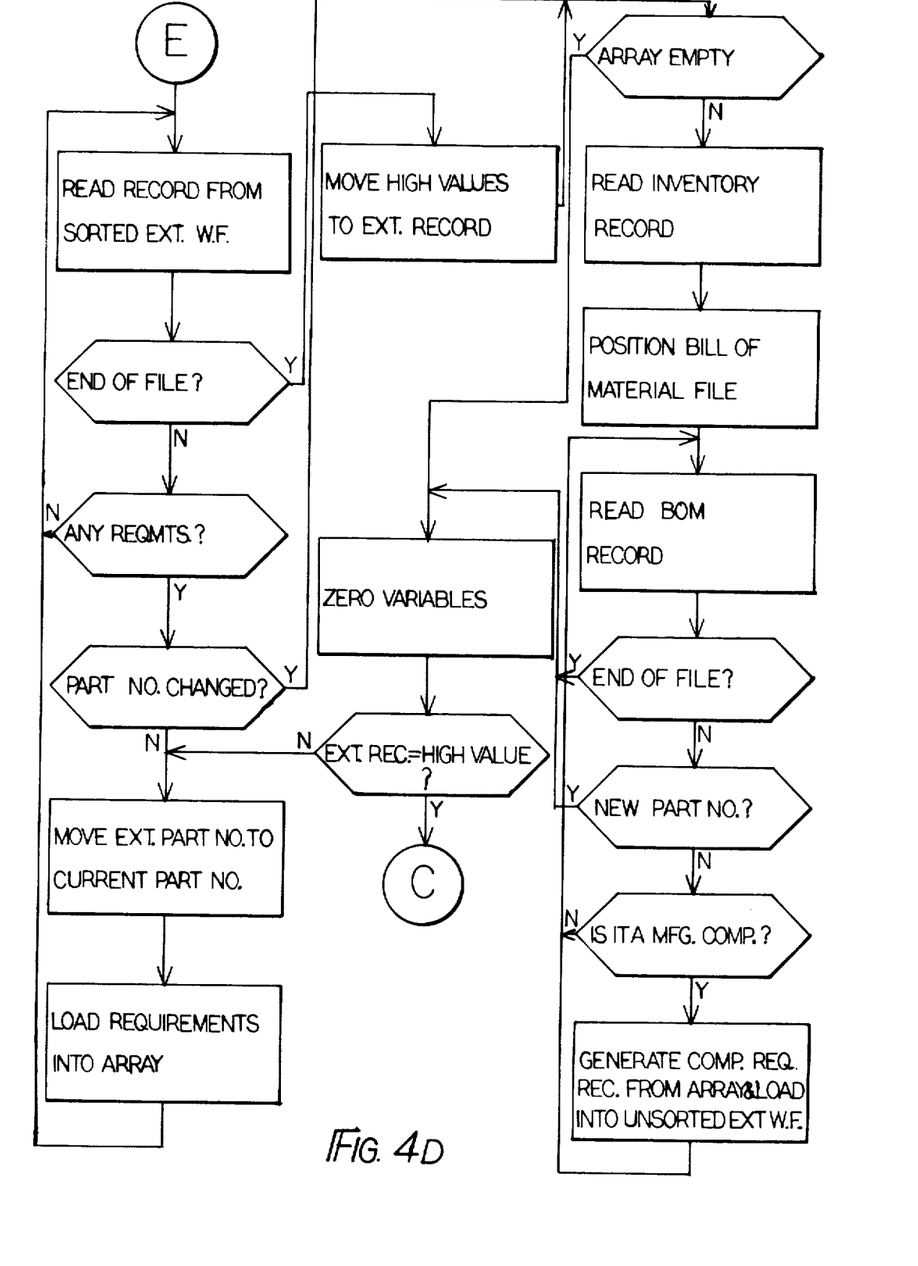

Turning then to FIG. 4D, the next (or first) updated record from the sorted extract work file is read and a check is made to determine whether it is at the end of the file. If not, the quantities required field for the record is interrogated for nonzero quantities to determine if any remaining components are needed to be made after allocation of the workorder designated stock which took place in the previously described process.

If there are some requirements left and the part number has not changed from the previous record, the extract part number is moved to the current part number. Then, CPU 12 begins to reload the arrays in high speed memory 14 in the same manner as described above. This process continues until a new part number is detected. At that time the array quantities are again exploded in very much the same manner as also described above. The inventory record for the current part number is read and the bill of materials file is positioned to read the first bill of materials record for the current part number. Next, the bill of materials record is read and a determination is made as to whether the components associated with the bill of materials record is a manufactured component, assuming that the record was not at the end of the file or associated with a new part number. If it is a manufactured component the CPU operates to generate component requirement records from the array information and writes the records into the unsorted extract work file. This record in the extract work file is generated in the same manner as described in the first explosion process. After all of the new additional extract work file records have been produced, the CPU operates to generate the sorted extract work file in disk memory 22. The sorted extract work file is then again used to update the work orders in the job file as previously described in connection with FIG. 4C. This process continues until there are no more requirements generated by these explosion processes, at which time the unsorted extract work file will be empty and the process is terminated. At that time, the status of the job file is as follows:

Actual Customer Orders as well as Planned Customer orders will contain data relating to the end item part number, quantities, and associated due dates listed by customer identification number. The work order portions of the job files will include all of the necessary data to control the production of the manufactured components that are made by the user as prerequisites for making the total end items required by the customer orders. The information in the work order portion of the job file defines the part number of the component that is needed to be manufactured, the quantities required, and when the fabrication of the components must begin in order for them to be completed in time to be used fo fulfill the customer orders.

It will be appreciated by a person skilled in the art that the information stored in the job file can be used to control the production of manufactured components. The information in the job file can be further exploded by the bill of materials file to generate a materials requirement planning report (MRP) according to conventional processes. This MRP report contains all purchased materials needed to manufacture end items for existing and planned customer orders. The materials requirement planning report may be used to identify raw materials that are needed to be purchased and those quantities of components that are purchased from outside vendors that are necessary to fulfill the customer orders. MRP reports are generated in the following general form:

|  | Material Identification (Part X) In Stock (200) | | | |
| --- | --- | --- | --- | --- |
|  | Time Period 1 | Time Period 2 | Time Period 3 | Beyond |
| On Order | 0 | 40 | 0 | 15 |
| Required | 80 | 150 | 70 | 50 |
| Balance | 120 | 10 | −60 | −95 |

The In Stock quantity is added to the On Order quantity for period 1 and the Required quantity is subtracted to derive a projected balance at the end of period 1. This balance is similarly applied to period 2 and so forth. A negative balance denotes a projected shortage. It can now be realized that the information in the job files provided by the invention can affect the MRP report in 2 ways. (1) Where a manufactured component appears on the MRP report, the work order requirements may be interpreted as "on order" for that component. That is, provided the user intends to adhere to the generated production schedule in the work order jobs. (2) The work order jobs may serve as the basis of an MRP requirements explosion for determining purchased material requirements to make the component.

The data generated by the system of the present invention and stored in the job files in disk memory 20 provides an extremely powerful tool to aid management in the efficient scheduling of production of manufactured components. CPU 12 can be instructed to print out on printer 26 a report listing the work order portions of the job file. Management can then use this report to begin making the designated quantities of the components at the designated due dates. Alternatively, if the manufactured components are made by automated machinery, CPU 12 can provide control signals to the machines 26, 28, 30 to initiate the production of the proper component quantities and at the required time that is necessary to fulfill the customer orders. This can be readily accomplished by CPU 12 periodically scanning the data in the work order portion of the job file and then sending appropriate control signals to the machines to generate the designated quantities when the due dates correspond to the current date.

One skilled in the art can now realize that the present invention provides all of these advantages, while at the same time requiring very little shop floor reporting. There is no need to continuously inform the data processing system of any deviations of originally designated stock since the system of the present invention does not directly allocate stock to any given customer order. The only feedback from the floor that is necessary is when an end item is completed for stock or for shipment, at which time the inventory file should be updated using conventional means.

As noted before, the present invention may be implemented by general purpose computer programmed by a set of software instructions performing the operational steps set forth herein or by a special purpose computer. In any event, various modifications of the present invention will become apparent to one skilled in the art upon a study of the specification, drawings and the following claims.

I claim:

1. A data processing machine for controlling production of manufactured components, said machine comprising:

input means for receiving production information, said production information including job data consisting of actual customer orders, planned customer orders, and internal work orders; said production information further including inventory data and bill of materials data;

memory means for storing digitized representations of said production information in a random access storage device, said storage device being divided into separate files, one each for said job data, inventory data, and bill of materials data; said job file being arranged into a plurality of individual jobs in which the information therefore is presented in the same format, said format including a customer identification number, an end item part number, and a series of due dates and associated end item quantities for the same customer and part number; the customer identification number for all job files reflecting actual customer orders being assigned a given number associated with the customer, the customer identification number for each job file reflecting planned customer orders being assigned a user selectable number, and the customer identification number for internal work orders being assigned the same number as the part number in the job file; said inventory file including data representing the quanitity in stock and fabrication lead time for each part; said bill of materials file including data representing each of the parts and associated quantities used to make a given end item;

control means responsive to a first command for interrogating said job files in a given order and the inventory file for the part associated with the job file interrogated, allocating inventory stock to each job file as a function of the total quantity required therein and the amount of remaining stock, said control means loading a number representing the allocated stock into the job file in said memory means as a designated stock quantity and reducing the quantity in stock in said inventory file; said stock being allocated first to actual and planned customer orders beginning with the oldest due date and then to work orders;

said control means being responsive to a second command to interrogate said job files in a given order and subtract the designated stock quantity from the total requirements quantity for actual and planned customer orders for each job file thereby calculating total requirements for a given part, said control means reading the bill of materials file and fabrication lead time from the inventory file and generating an extract work file including the quantities and due dates for each manufactured component associated with the total requirements of end item parts defined by the customer orders; said control means totaling the quantity of said components in the extract work file and subtracting the previously designated stock quantity from corresponding work orders in the job file to arrive at the net quantity of manufactured components necessary to complete the end item part requirements for the customer orders, said control means loading the manufactured component quantities from the extract work file into the job file associated with the work orders whereby said work order portion of the job file contains information defining the type, quantity, and due date by which each manufactured component must be made by the user in order to fill the customer orders; and output means for utilizing the information in the memory means to control the production of manufactured components.

2. A method of controlling the production of manufactured components, said method comprising:

entering production information into a data processing machine, said production information including actual customer order data for a given end item including quantities required thereof, planned customer order data for a given end item including quantities required thereof, work order data for all manufactured components that are made by the user for incorporation into the end item, inventory data including the in stock quantity and fabrication lead time of parts, and bill of materials data defining the types and quantities of materials required to make the end item;

storing digitized representations of said production information in a memory, said memory being arranged so as to store customer and work order data in a job file, said inventory data in an inventory file, and said bill of material data in a bill of materials file;

commanding said data processing machine to interrogate said job file and said inventory file and to allocate stock from the inventory file first to customer orders and then to work orders by writing designated stock quantities into the job file and reducing the in stock quantity in said inventory file;

commanding said machine to total the quantities required of each end item by reading the customer orders in the job file; to explode the total quantities required by the data stored in the bill of materials file to obtain a series of extracted records defining the types, quantities, and due dates for all materials used in making the end item; to store said records as a group in preselected memory locations; to subtract the designated stock quantity associated with the work orders in the job file from the extract records to obtain net quantities required; and to load the extract quantities and due dates into the work orders in the job file associated with those extract records relating to the manufactured components whereby to generate in said job file a series of work orders for manufactured components which contains data defining the quantities and dates on which the user should begin making the components; and reading said job file and using the data therein to control the production of manufactured components.

3. A method of allocating inventory for the purpose of generating work orders for producing manufactured components, said method comprising:

entering production information into a data processing machine, said production information including customer order data for a given end item including quantities required thereof, and further including inventory data including the in-stock quantity of parts;

storing digitized representations of said production information in a memory, said memory being arranged so as to store said customer order data in a job file and said inventory data in an inventory file;

commanding said data processing machine to interrogate said job file and said inventory file and to allocate stock from the inventory file by writing designated stock quantities into the job file and reducing the in-stock quantity in said inventory file; and commanding said data processing machine to read said designated stock quantities in the job file and generate a series of work orders for manufactured components as a function thereof.

4. The method of claim 2 or 3 wherein the job file is arranged into a plurality of jobs in which the information therein is presented in the same format, said format including a customer identification number, an end item part number, and a series of due dates and associated end item quantities for the same customer and part number.

5. The method of claim 4 wherein the customer identification number for all jobs reflecting actual customer orders are assigned a given number associated with the customer, the customer identification number for each job reflecting planned customer orders being assigned a user selectable number, and the customer identification number for internal work orders being assigned the same number as the part number.

6. The method of claim 5 wherein inventory is allocated to the job file in chronological order according to the due dates in the job file.

7. The method of claim 3 wherein the inventory data further includes fabrication lead time of parts, and wherein bill of materials data is also stored defining the types and quantities of materials required to make the end item; and wherein the method further includes the steps of:

subtracting said designated stock quantities from required customer quantities to arrive at net end item quantities required;

exploding said net end item quantities by the bill of materials data and using the fabrication lead time to generate information defining the types, quantities and due dates for all manufactured components necessary to satisfy the net end item quantities required; and loading said information into the job file in the same format as the customer order data was stored.

8. The method of claim 7 wherein the job file is arranged into a plurality of identically formated jobs, the format of each job including a customer identification number, an end item part number, and a series of due dates and associated end item quantities for the same customer and part number.

9. The method of claim 8 wherein said information is loaded into the job file in records whose customer identification number is the same as the part number.

10. The method of claim 9 wherein inventory is allocated to the job file in chronological order according to due dates in the job file.

* * * * *